(12) United States Patent
Schütt et al.

(10) Patent No.: US 7,556,294 B2
(45) Date of Patent: Jul. 7, 2009

(54) TUBULAR ROTARY JOINT

(75) Inventors: Günter Schütt, Neumünster (DE); Arnold Beck, Neumünster (DE)

(73) Assignee: Oerlikon Textile GmbH & Co. KG, Remscheid (DE)

(*) Notice: Subject to any disclaimer, the term of this patent is extended or adjusted under 35 U.S.C. 154(b) by 37 days.

(21) Appl. No.: 11/776,868

(22) Filed: Jul. 12, 2007

(65) Prior Publication Data

US 2008/0025656 A1 Jan. 31, 2008

Related U.S. Application Data

(63) Continuation of application No. PCT/EP2006/000071, filed on Jan. 6, 2006.

(30) Foreign Application Priority Data

Jan. 13, 2005 (DE) .................. 10 2005 001 557

(51) Int. Cl.
*F16L 27/00* (2006.01)
*F16L 27/087* (2006.01)
*F16L 41/08* (2006.01)
*F16L 41/18* (2006.01)

(52) U.S. Cl. .............. 285/122.1; 285/121.3; 285/121.5; 285/121.6; 285/127.1; 285/129.1

(58) Field of Classification Search .............. 285/121.3, 285/121.5, 121.6, 122.1, 127.1, 129.1, 148.4, 285/190, 273, 284.1
See application file for complete search history.

(56) References Cited

U.S. PATENT DOCUMENTS

| | | | |
|---|---|---|---|
| 2,768,843 A | | 10/1956 | Zeilman |
| 3,088,759 A | * | 5/1963 | Corsette ..................... 285/190 |
| 3,210,099 A | * | 10/1965 | Franck ....................... 285/190 |
| 4,111,468 A | * | 9/1978 | Schneider ................... 285/190 |
| 4,219,155 A | * | 8/1980 | Goerss ....................... 239/124 |
| 4,323,268 A | * | 4/1982 | Wilson ......................... 285/41 |
| 4,561,679 A | * | 12/1985 | Choate ......................... 285/95 |
| 4,928,997 A | * | 5/1990 | Reisener et al. .............. 285/13 |
| 5,080,401 A | * | 1/1992 | Stich .......................... 285/190 |
| 5,110,159 A | * | 5/1992 | Herold et al. ............ 285/121.5 |
| 5,193,915 A | | 3/1993 | Leidenfrost |
| 6,056,325 A | * | 5/2000 | Bernard ....................... 285/39 |
| 6,070,917 A | * | 6/2000 | Wiebe ......................... 285/272 |
| 6,086,112 A | * | 7/2000 | Schofield et al. .............. 285/98 |
| 6,109,659 A | * | 8/2000 | Heidenreich et al. .......... 285/13 |

(Continued)

FOREIGN PATENT DOCUMENTS

DE 7000900 U 6/1977

*Primary Examiner*—James M Hewitt
(74) *Attorney, Agent, or Firm*—Alston & Bird LLP

(57) ABSTRACT

The invention relates to a tubular rotary joint, in particular for conducting a polymer melt, comprising a holder and a mobile connection body, which is rotatably connected to the holder by means of one bearing end. A distribution chamber with a feeder is configured in the holder, said chamber being connected to a distribution channel that is configured in the connection body. The distribution channel in the connection body leads to a connection end, to which a pipe section can be coupled. To guarantee the flexibility of the connection body at high pressure and at high temperatures, the bearing end of the connection body is configured as a shaft journal, which is rotatably mounted in a bearing bore that penetrates the distribution chamber in the holder.

9 Claims, 4 Drawing Sheets

U.S. PATENT DOCUMENTS 6,299,219 B1 * 10/2001 Hoegger .................... 285/190
6,494,498 B2 * 12/2002 Brandt et al. ............... 285/319
6,679,527 B2 * 1/2004 Hoffman et al. ............ 285/190

* cited by examiner ously supply fluid to two pipe sections connected to the rotary joint.
TUBULAR ROTARY JOINT

CROSS-REFERENCE TO RELATED APPLICATIONS

The present application is a Continuation of International Application No. PCT/EP2006/000071, filed Jan. 6, 2006, and which designates the U.S. The disclosure of the referenced application is incorporated herein by reference.

FIELD OF THE INVENTION

The invention relates to a tubular rotary joint, in particular tubular rotary joints for conducting a polymer melt.

BACKGROUND OF THE INVENTION

When laying and constructing pipelines, it is known to enable the rotatability of pipe sections by means of so-called tubular rotary joints. A tubular rotary joint of this type has been disclosed, for example, in DE 70 00 900 U. Here, a holder and a connection body, which is rotatably connected to the holder, interact in order to design a pipe section, which is connected to the connection body and can move in relation to the holder. Within the holder, a distribution chamber is provided, which is coupled to a distribution channel of the connection body. In the known device, a slide bearing is used in order to enable the rotary motion of the connection body. A system of this type can be used only for higher temperatures with average pressure load. However, in addition to high temperatures, high pressures also arise when conducting polymer melts. These high pressures lead to correspondingly high radial and axial forces. However, such high-pressure forces cannot be taken up by the slide bearing, particularly in the design disclosed in the prior art.

For this purpose, tubular rotary joints are likewise known from the prior art, in which the slide bearing is replaced by roller bearings. It is thus indeed possible to apply high pressures. However, according to the invention, roller bearings have a limited suitability for high temperatures. Another problem of the tubular rotary joints disclosed in the prior art is that a free rotatability of the connection body in the holder is not ensured at high pressures. In particular, forces acting only on one side of the connection body can be particularly detrimental.

It is an object of the invention is to further improve a tubular rotary joint of the known kind, particularly for conducting a polymer melt. In one embodiment, a secure operability is assured even at high temperatures of over 250° C. and high pressures of above 200 bar.

SUMMARY OF THE INVENTION

According to the invention, this objective is attained by means of a tubular rotary joint.

Advantageous refinements of the invention are defined by the features and combinations of features of the dependent claims.

A special advantage of the invention is that the connection between the holder and the connection body is formed by means of a shaft-hub connection. For this purpose, the connection body comprises a shaft journal, which is mounted in a bearing bore of the holder. The bearing bore penetrates the distribution chamber such that loads acting on one side of the connection body and resulting from the fluid pressures within the distribution chamber are avoided.

This improved version of the tubular rotary joint is particularly advantageous, in which the bearing bore completely penetrates the holder to form two bearing points so that approximately equal pressure forces act on the shaft journal in both the bearing points. The bearing bore is preferably designed in the bearing points such that its diameter is of equal size so that the pressures acting on the shaft journal are compensated.

Seals for sealing the distribution chamber are assigned advantageously to the bearing points between the holder and the shaft journal.

The seals in the bearing points can be formed using temperature-resistant packing glands. It is particularly advantageous if the packing glands are held by adjustable pre-tensioning means in order to enable a complete sealing of the distribution chamber. On the other hand, it is particularly advantageous when conducting a polymer melt if a small quantity of the polymer can be guided out of the bearing points on both sides of the distribution chamber in order to discharge, for example, any broken-down polymer material.

In conjunction with slide bearings, even gap seals are implemented preferably between the shaft journal and the holder.

The shaft journal is mounted preferably using a slide bearing support, so that it is possible to implement small shaft bearing clearances having a diameter of <0.15 mm.

In order to ensure the connection between the distribution chamber of the holder and the distribution channel of the connection body in any position of the connection body, the distribution chamber according to an advantageous refinement is formed within the holder by means of a groove, which surrounds the shaft journal substantially concentrically. Thus, at the circumference of the shaft journal, there is sufficient quantity of fluid, which can reach the distribution channel inserted in the connection body.

However, the distribution chamber can also be designed using a circumferential recess on the shaft journal. Depending on the diameter of the shaft section with the recess, the distribution chamber can be designed concentrically to the bearing bore inside or outside the latter so as to ensure a constant uniform distribution and guidance of the melt when the shaft journal rotates.

The distribution channel can be designed advantageously in the connection body by means of a blind hole from the connection end up to the shaft journal. The closed end of the blind hole in the shaft journal is connected by means of a cross hole to the distribution chamber located outside. The shape of the cross hole and the blind hole can be designed such that there results the smallest possible pressure loss when the polymer melt flows through the tubular rotary joint.

According to an advantageous refinement of the tubular rotary joint, the distribution channel of the connection body can be formed by means of a through-hole from the connection end to a second opposite connection end, wherein the through-hole in the region of the shaft journal is connected by means of a cross hole to the distribution chamber. It is possible by means of this refinement of the invention to simulta-

BRIEF DESCRIPTION OF THE DRAWINGS

The invention will be explained below in more detail based on a few exemplary embodiments of the tubular rotary joint and with reference to the attached drawings, in which.

DETAILED DESCRIPTION OF PREFERRED EMBODIMENTS

Figure 1:
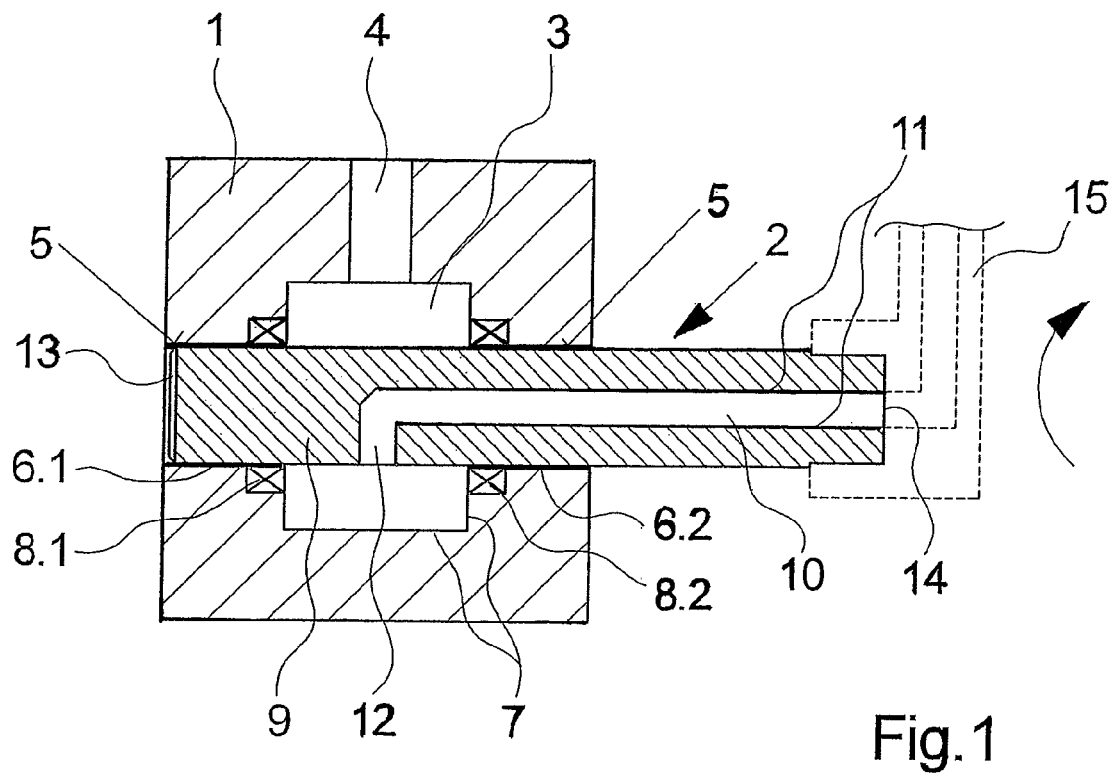
FIG. 1 schematically shows a longitudinal view of a first exemplary embodiment of the tubular rotary joint according to the invention FIG. 2 schematically shows a cross-sectional view of the exemplary embodiment illustrated in FIG. 1
Figure 2:
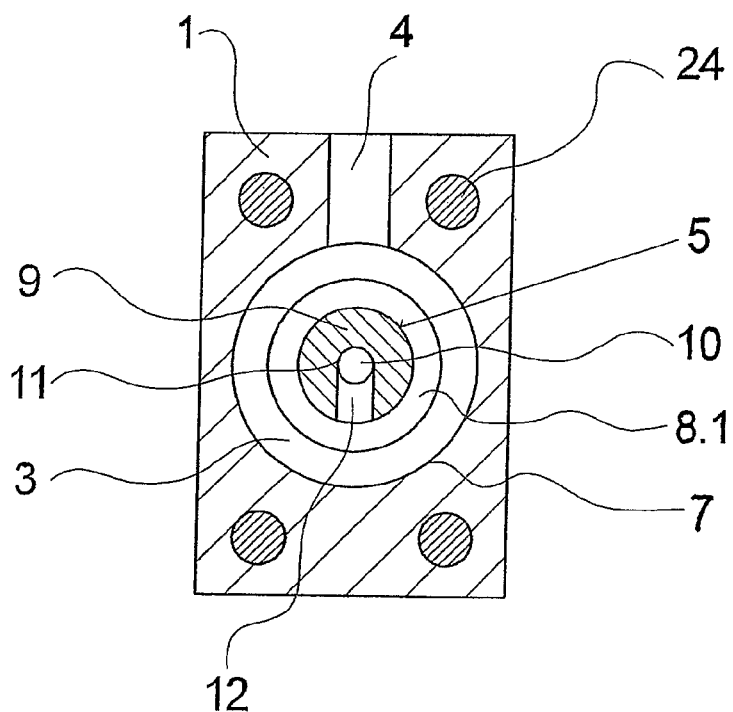

FIGS. 1 and 2 show different views of a first exemplary embodiment of a tubular rotary joint. FIG. 1 shows a longitudinal view of the exemplary embodiment, and FIG. 2 shows a cross-sectional view thereof. The following description shall apply to both the figures unless there is explicit reference made to either of the figures.

The tubular rotary joint comprises a cuboid holder 1. In the holder 1, a distribution chamber 3 is formed, which is connected to a feeder 4. The feeder 4 is designed at the upper side of the holder 1, and is connected to a pipe section, which is not shown here.

In the holder 1 a bearing bore 5, which is directed transversely to the feeder 4, is formed in the middle region of the holder 1. The bearing bore 5 penetrates the distribution chamber 3 and the adjoining sidewalls of the holder 1. The distribution chamber 3 is formed by means of a circumferential groove 7 substantially concentrically to the bearing bore 5 within the holder 1. A connection body 2 is rotatably mounted in the bearing bore 5 of the holder 1. For this purpose, a bearing end 13 of the connection body 2 is designed as a shaft journal 9, which is rotatably mounted in the bearing points 6.1 and 6.2 of the holder 1. One connection end 14 of the connection body 2 protrudes laterally from the bearing bore 5 of the holder 1. A pipe section 15 is coupled to the free end of the connection end 14. Within the connection body 2, a distribution channel 10 is formed by a blind hole 11 from the connection end 14 towards the bearing end 13. In the region of the shaft journal 9, the blind hole 11 comprises a cross hole 12, by means of which the blind hole 11 is connected to the distribution chamber 3.

As shown in FIG. 2, the groove 7 is designed substantially concentrically to the circumference of the shaft journal 9 to form the distribution chamber 3 in the holder 1 so that the distribution chamber 3 is always connected to the distribution channel 10 in any position of the shaft journal 9.

Several heating elements 24 can be integrated into the holder 1, which heating elements heat that region of the tubular rotary joint that conducts the melt.

It is clear from FIG. 1 that seals 8.1 and 8.2 are disposed between the shaft journal 9 and the bearing points 6.1 and 6.2 of the holder 1 so that the distribution chamber 3 is sealed from the outside. In addition, means (not illustrated) act on the shaft journal 9 for securing it axially so as to avoid any impermissible axial movement of the connection body 2.

In the exemplary embodiment shown in FIGS. 1 and 2, a high-temperature polymer melt is conveyed under high pressure by means of the feeder 4 into the distribution chamber 3. From the distribution chamber 3, the polymer melt flows through the cross hole 12 to the blind hole 11. The distribution channel 10 thus formed guides the polymer melt thereafter to the connected pipe section 15. The pipe section 15 can be rotated relative to the holder 1 about the shaft journal 9 acting as an axis. Rotation angles in the range of 360° and above are possible.

In this exemplary embodiment, the bearing points 6.1 and 6.2 are designed as sliding support or plain bearings, the diameters of the bearing clearances amounting to a maximum of 0.15 mm. It is thus possible to rotate the shaft journal 9 even at higher temperatures.

The bearing points 6.1 and 6.2 could also be designed to include a bushing or a roller bearing, if appropriate. In principle, it is particularly advantageous to provide the shaft journal with a symmetrical design in the two bearing points in the tubular rotary joint according to the invention since substantially compensated pressure forces act on the connection body 2, thereby maintaining the free movement of the rotation of the shaft journal 9 even at higher pressures. The seal provided in the exemplary embodiment shown in FIGS. 1 and 2 for sealing the distribution chamber is illustrated by way of example. The location and type of seal can be selected freely for sealing purposes. Thus, gap seals could also be designed between the shaft journal and the holder, thereby eliminating the necessity of additional sealing means.

Figure 3:
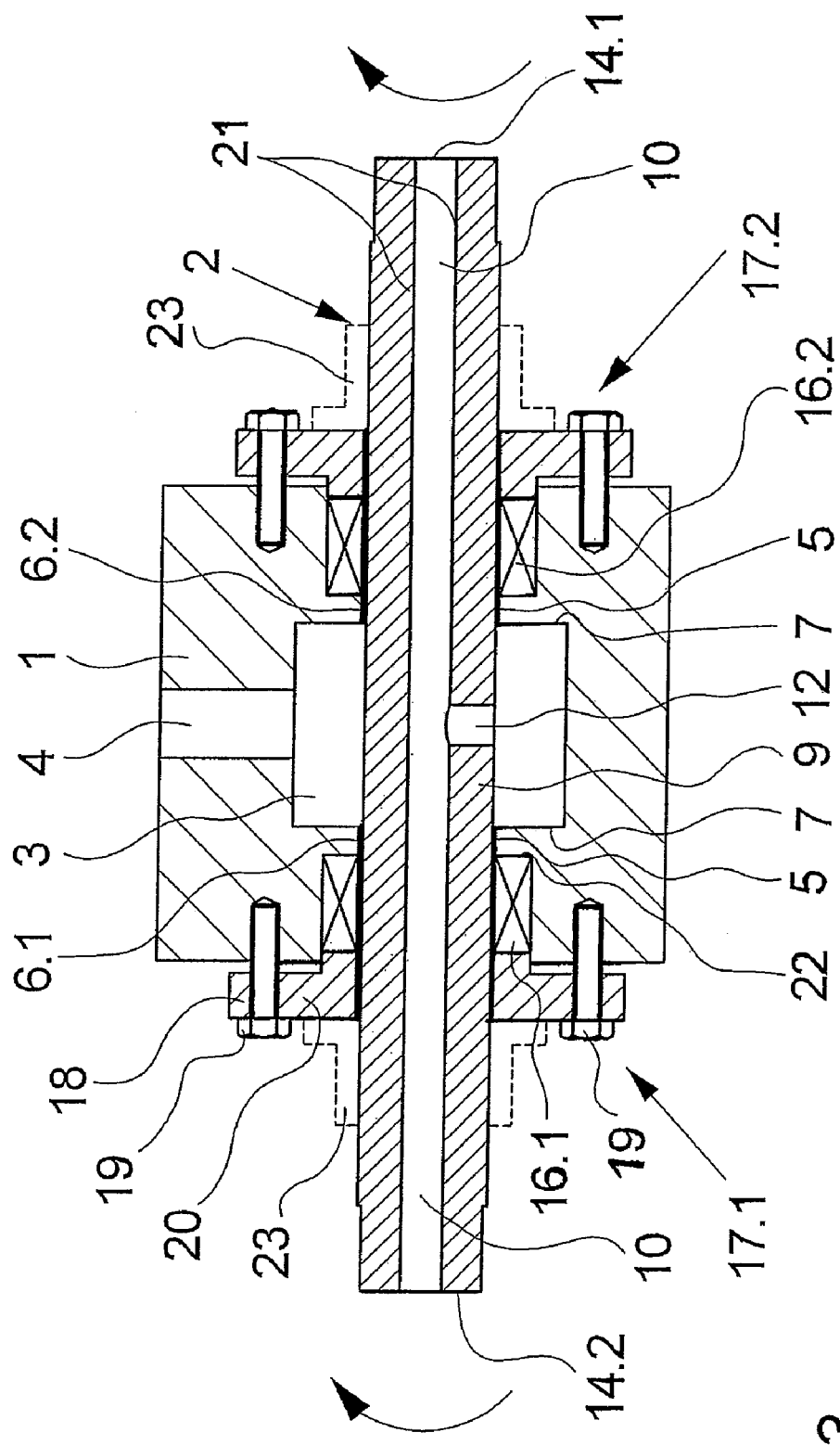
FIG. 3 schematically shows a longitudinal view of another exemplary embodiment of a tubular rotary joint according to the invention

FIG. 3 shows another exemplary embodiment of the tubular rotary joint according to the invention. FIG. 3 shows a longitudinal view of the exemplary embodiment, the cross-sectional view of which is substantially identical to the exemplary embodiment shown in FIG. 2.

The tubular rotary joint comprises a holder 1 and a connection body 2 mounted in the holder 1. The holder 1 is designed with a distribution chamber 3, which can be connected by means of a feeder 4 to an external pipe section. The distribution chamber 3 is formed as a groove 7 and is concentric to the shaft journal 9. The distribution chamber 3 is penetrated by a bearing bore 5, which completely penetrates the walls of the holder 1. In the bearing bore 5, a shaft journal 9 is rotatably mounted in the bearing points 6.1 and 6.2 of the holder 1. On each of its sides, the shaft journal 9 comprises a connection end 14.1 and 14.2, to which a pipe section can be coupled. The connection body 2 thus formed is penetrated by a through-hole 21, which together with a cross hole 12 forms the distribution channel 10 in the region of the shaft journal 9 within the distribution chamber 3.

Packing glands 16.1 and 16.2 are disposed at the bearing points 6.1 and 6.2 respectively between the shaft journal 9 and the holder 1. Pre-compressioning means 17.1 and 17.2 are designed concentrically to the shaft journal 9 on both the sides of the holder 1, so that a pre-compressioning force is exerted on the packing glands 16.1 and 16.2. In this case, since each of the pre-compressioning means 17.1 and 17.2 is designed identically, only the pre-compressioning means 17.1 is explained below in further detail. The pre-compressioning means 17.1 is formed by means of an annular straining collar 20, which is molded to a ring flange 18. The ring flange 18 is concentric to the shaft journal 9 and is coupled to the holder 1 by means of the straining screw 19. The straining collar 20 acts on a front side of the packing gland 16.1. The opposite inner side of the packing gland 16.1 is held by a portion 22 of the holder 1.

The ring flange 18 can be fixed to the holder 1 by clamping the straining screws 19 depending on the desired preliminary compression of the packing gland 16.1. Thus, the packing glands 16.1 and 16.2 can be adjusted so as to ensure a complete sealing of the distribution chamber 3 from the surroundings. However, even permissible leakages can be adjusted, in order to be able, for example, to continuously discharge the consumed polymer material from the distribution chamber 3. In this respect, the adjustability of the packing glands 16.1 and 16.2 is particularly advantageous for ensuring the impermeability of the tubular rotary joint while conducting a polymer melt.

In the exemplary embodiment shown in FIG. 3, a polymer melt that is supplied by means of the feeder 4 can be uniformly guided during operation to the two connection ends 14 of the connection body 2. To avoid an impermissible axial movement of the shaft journal, fixing collars 23 can each be assigned to the straining collars 20 outside the holder 1. The position of the shaft journal in the axial direction is secured by means of the fixing collar 23. The fixing collar 23 is shown using dashed lines in FIG. 3.

Figure 4:
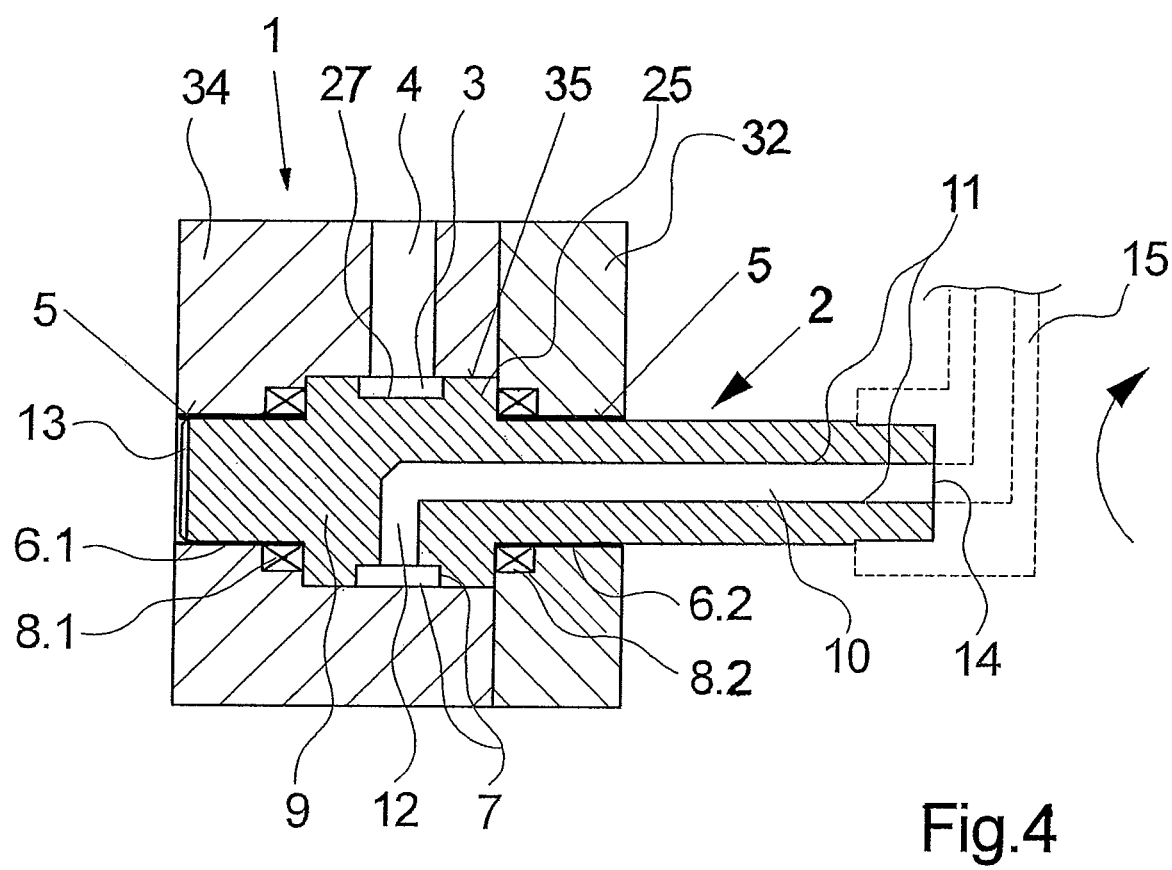
FIG. 4.

FIG. 4 schematically shows a longitudinal view of another exemplary embodiment of the tubular rotary joint according to the invention.

According to the exemplary embodiment shown in FIG. 4, the holder 1 is formed using several components, wherein a distribution housing 34 contains a penetrating bearing bore 5, in which the bearing end 13 of the shaft journal 9 is mounted. On its front side and coaxially to the bearing bore 5, the distribution housing 34 comprises a receiving hole 35, in which a shaft shoulder 25 of the shaft journal 9 is guided. For connecting a pipe section, the distribution housing 34 comprises a feeder 4, which is aligned substantially transversely to the bearing bore 5. The feeder 4 opens into the receiving hole 35. In the region of the feeder 4, a circumferential recess 27 is inserted in the shaft shoulder 25, which recess forms the distribution chamber 3 within the holder 1. The recess 27 in the shaft shoulder 25 connects to a cross hole 12 at the groove base. This cross hole is connected to a middle blind hole 11 and thus represents the connection of the distribution chamber 3 to the distribution channel 10.

For mounting the shaft journal 9, a bearing plate 32 is provided on the connection end 14 of the shaft journal 9. This bearing plate 32 is connected to the distribution housing 34 and contains a bearing bore 5 to form the second bearing point 6.2.

A pipe section 15 for connecting a melt line is provided on the free connection end 14 of the shaft journal 9 that protrudes from the bearing plate 32.

For sealing the distribution chamber 3 formed within the holder, seals 8.1 and 8.2 are disposed at both the sides of the shaft shoulder 25, each of said seals extending concentrically to the bearing bore 5. Furthermore, gap seals could also be designed between the shaft shoulder 25 and the receiving hole 35.

However, in the exemplary embodiment shown in FIG. 4, it is also possible to design the distribution chamber by means of a circumferential groove, which extends concentrically to the receiving hole and opens directly into the receiving hole 35 and is connected to the feeder 4. In this case, the shaft shoulder will not have any circumferential recess.

Figure 5:
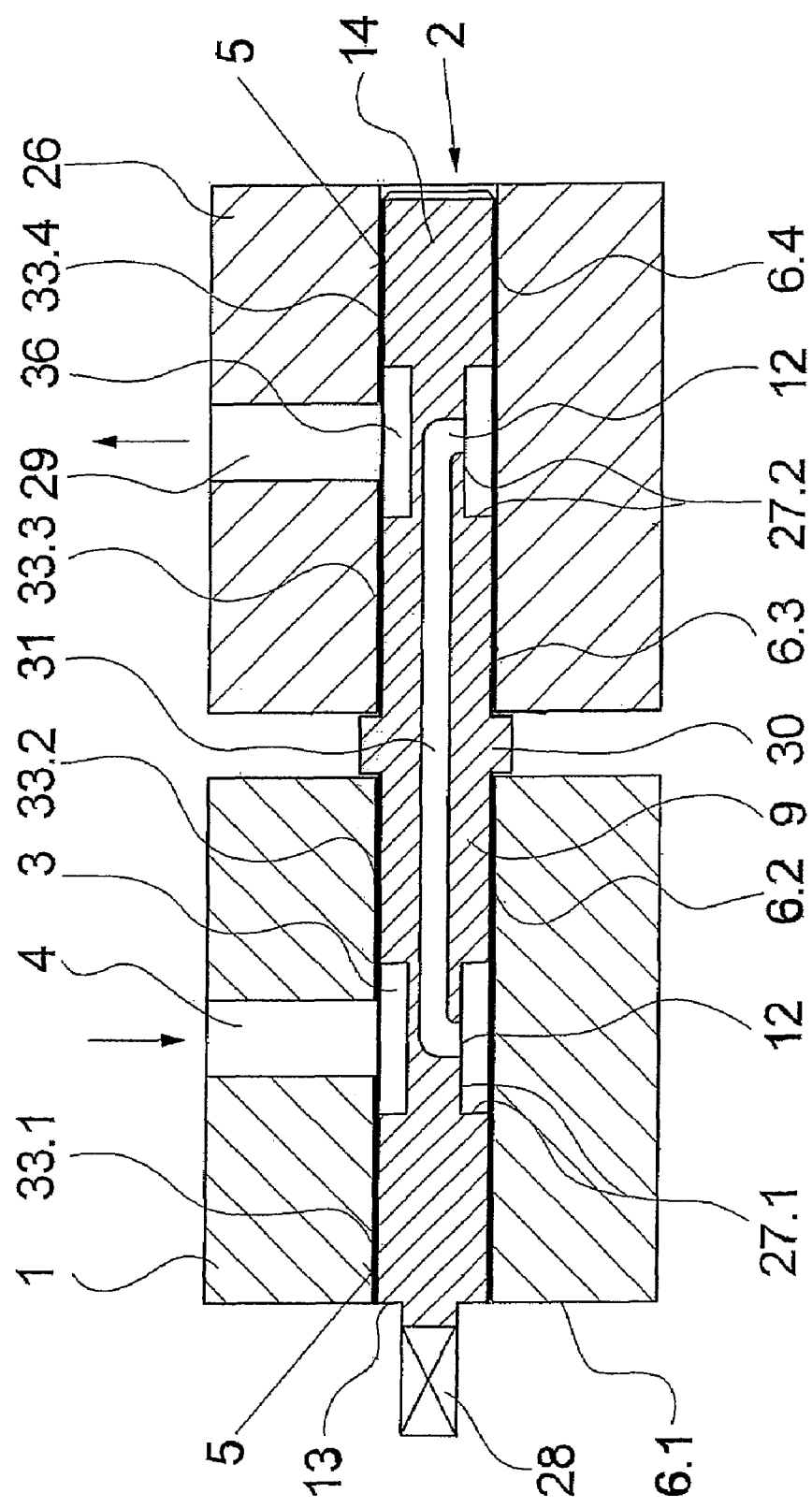
FIG. 5 schematically show longitudinal views of additional exemplary embodiments of the tubular rotary joint according to the invention.

FIG. 5 shows another exemplary embodiment of a possible design of the tubular rotary joint. FIG. 5 schematically shows a longitudinal view of the tubular rotary joint.

In this exemplary embodiment, the connection body 2 is likewise formed by means of a shaft journal 9, which is mounted in a holder 1 by means of a bearing end 13. The holder 1 comprises a penetrating bearing bore 5, in which the shaft journal 9 is mounted in the bearing points 6.1 and 6.2. Between the bearing points, the shaft journal 9 comprises a recess 27.1, which is connected to a feeder 4 within the holder 1. At the groove base of the recess 27.1 of the shaft journal 9, a cross hole 12 is designed, which opens into a distribution hole 31.

That free end 14 of the shaft journal 9 that protrudes from the holder 1 supports a movable holder 26, which comprises a penetrating bearing bore 5 and is mounted by means of the connection end 14 of the shaft journal 9 in the bearing points 6.3 and 6.4. Between the bearing points 6.3 and 6.4, the connection end 14 of the shaft journal comprises a second recess 27.2, which is connected in its groove base to the distribution hole 31 by means of a cross hole 12. The movable holder 26 comprises a discharge outlet 29 for connecting a pipe section. This discharge outlet opens into the recess 27.2 of the shaft journal 9. The recess 27.2 on the circumference of the shaft journal 9 forms a distribution chamber 36.

Between the bearing end 13 and the connection end 14, the shaft journal 9 comprises a circumferential separating web 30, which secures the shaft journal 9 in the axial direction. The separating web 30 is designed outside the bearing bores 5, between the holder 1 and the movable holder 26.

At the bearing end 13 of the shaft journal, a drive adapter 28 is provided, by means of which a rotary drive can be connected to the shaft journal 9. The shaft journal 9 is thus advantageously prevented from getting stuck inside the holder 1.

The functioning of the embodiment of the tubular rotary joint shown in FIG. 5 is substantially identical to the preceding exemplary embodiments. Thus, a polymer melt is supplied through the feeder 4 by means of a stationary melt supply line. The polymer melt flows through the distribution chamber 3 and the distribution channel 31 and reaches the discharge chamber 36 and the discharge outlet 29 connected thereto. The melt distribution takes places independently of the position of the shaft journal and the positions of the holder 1 and the holder 26 relative to each other. For sealing the distribution chamber 3 and the discharge chamber 36 designed at the connection end, gap seals 33.1 and 33.2 are designed between the shaft journal 9 and the holder 1. Similarly, gap seals 33.3 and 33.4 are designed between the holder 26 and the shaft journal 9.

FIG. 1 to FIG. 5 show the structure and design of the individual components of the exemplary embodiments only by way of example. In principle, for example, the sealing concept of the exemplary embodiment shown in FIG. 1 or FIG. 3 can also be implemented in the exemplary embodiment shown in FIG. 5.

That which is claimed is:

1. A tubular rotary joint conducting a polymer melt, said tubular rotary joint comprising:
    a holder including one or more heating elements, and further comprising a distribution chamber and a bearing bore; and
    a mobile connection body having a distribution channel located within the mobile connection body, wherein the connection body is rotatably connected to the holder and defines a bearing end or connection end and an opposite connection end that can be coupled to a pipe section, the distribution chamber of the holder being fluidly connected to the distribution channel of the connection body, and
    wherein the bearing end of the connection body comprises a shaft journal which is rotatably mounted in the bearing bore in the holder, and wherein the bearing bore penetrates the distribution chamber.

2. A tubular rotary joint according to claim 1, wherein the bearing bore completely penetrates the holder to form at least two bearing points such that the shaft journal is mounted at the bearing points, and wherein the diameter of the shaft journal is substantially of equal size at both bearing points.

3. A tubular rotary joint according to claim 2, further wherein seals are disposed adjacent the bearing points between the holder and the shaft journal.

4. A tubular rotary joint according to claim 3, wherein the seals adjacent the bearing points are each formed by a packing gland or a gap seal.

5. A tubular rotary joint according to claim 4, wherein the packing glands are each held adjacent the bearing points by an adjustable pre-compressioning element.

6. A tubular rotary joint according to claim 1, wherein the shaft journal is mounted in the holder by a slide bearing support.

7. A tubular rotary joint according to claim 1, wherein the distribution chamber is formed within the holder by a groove, which surrounds the shaft journal substantially concentrically.

8. A tubular rotary joint according to claim 1, wherein the distribution channel of the connection body is defined by a blind hole extending from the connection end to the shaft journal, and wherein the closed end of the blind hole in the shaft journal is connected by a cross hole to the distribution chamber.

9. A tubular rotary joint according to claim 1, wherein the distribution channel of the connection body is formed by a through-hole from the connection end to the opposite connection end, and wherein the through-hole is connected by a cross hole to the distribution chamber in the region of the shaft journal.

\* \* \* \* \*